United States Patent
Guillemot et al.

(10) Patent No.: US 7,848,334 B2
(45) Date of Patent: Dec. 7, 2010

(54) METHOD AND DEVICE FOR TRANSFERRING DATA PACKETS

(75) Inventors: Jean-Charles Guillemot, Thorigne Fouillard (FR); Claude Chapel, Rennes (FR); Thierry Tapie, Rennes (FR)

(73) Assignee: Thomson Licensing, Bologne, Billancourt (FR)

( * ) Notice: Subject to any disclaimer, the term of this patent is extended or adjusted under 35 U.S.C. 154(b) by 1256 days.

(21) Appl. No.: 10/459,249

(22) Filed: Jun. 11, 2003

(65) Prior Publication Data

US 2003/0231644 A1    Dec. 18, 2003

(30) Foreign Application Priority Data

Jun. 13, 2002   (FR) .................................. 02 07530

(51) Int. Cl.
   *H04L 12/28*  (2006.01)
(52) U.S. Cl. ............... 370/401; 370/395.7; 370/395.71; 370/428; 370/473; 370/537; 386/46; 386/91
(58) Field of Classification Search .................. 370/429
   See application file for complete search history.

(56) References Cited

U.S. PATENT DOCUMENTS

| | | | | |
|---|---|---|---|---|
| 4,941,156 A * | 7/1990 | Stern et al. | ................... | 375/372 |
| 6,289,020 B1 | 9/2001 | Sakaguchi | .................. | 370/395 |
| 6,633,578 B1 | 10/2003 | Matsumaru et al. | | |
| 6,657,999 B1 * | 12/2003 | Brewer | ........................ | 370/362 |
| 6,665,266 B1 * | 12/2003 | Brunheroto et al. | ......... | 370/232 |
| 6,792,000 B1 * | 9/2004 | Morinaga et al. | ........... | 370/473 |
| 7,123,614 B2 * | 10/2006 | Frouin et al. | ................. | 370/389 |
| 7,133,407 B2 * | 11/2006 | Jinzaki et al. | .......... | 370/395.64 |
| 2002/0064188 A1 | 5/2002 | Mizobata | .................... | 370/535 |
| 2002/0105905 A1 * | 8/2002 | Boyle et al. | ................. | 370/229 |

FOREIGN PATENT DOCUMENTS

| | | | |
|---|---|---|---|
| EP | 917355 A1 * | 5/1999 | |
| EP | 2000013448 | 1/2000 | |
| JP | 11-317748 | 11/1999 | |
| JP | 2000101594 | 4/2000 | |
| JP | 2000156698 | 6/2000 | |
| JP | 2000165828 | 6/2000 | |

OTHER PUBLICATIONS

Search Report.

* cited by examiner

*Primary Examiner*—Marivelisse Santiago-Cordero
*Assistant Examiner*—German Viana Di Prisco
(74) *Attorney, Agent, or Firm*—Robert D. Shedd; Joseph J. Opalach

(57) ABSTRACT

A device is coupled to a first network and a second network and comprises a first storage element and a second storage element. The device stores data packets originating from the first network in the first storage element and stores data packets destined for the second network in the second storage element. In particular, the device slaves the writing of a data packet intended for the second network into the second storage element to the reading of the data packet from the first storage element so that the transfer time inside the device is constant for all the data packets.

7 Claims, 1 Drawing Sheet

METHOD AND DEVICE FOR TRANSFERRING DATA PACKETS

The invention relates to a device and a method for transferring data packets between at least two data networks.

BACKGROUND OF THE INVENTION

The invention relates more particularly to the interconnecting of networks through a gateway.

When interconnecting networks, it is necessary to adapt the incident streams so as to transfer them to the destination network or networks.

This adaptation is often related to constraints related to several factors, in particular to the characteristics of the various networks, and also to the format of the incident stream.

When data packets arrive in the gateway, it is necessary to process them so as to transfer them to the subsequent network.

In a local audio/video distribution network of IEEE-1394 type, it is advisable to modify an incident stream of MPTS type (the acronym standing for "Multiple Programs Transport Stream") so as to make it secure and adapt it to the requirements of the local user.

The existing devices propose solutions based on stream adaptation carried out by gateways controlled by outside devices of processor type. These processors are often very busy and it is therefore difficult to guarantee the data packet processing time. This poses diverse problems and in particular such processors can hardly guarantee a constant processing time for the data packets in the gateway.

The invention therefore proposes a device making it possible to remedy the drawbacks mentioned.

BRIEF SUMMARY OF THE INVENTION

For this purpose, the invention proposes a device for transferring data packets between at least two data networks comprising
- first means for storing the data packets originating from a first network,
- second means for storing the data packets intended for at least one second network,
- means for filtering the data packets originating from the first network, and intended for sorting the said data packets so as to determine whether the said data packets are intended for at least one second network,
- means for transferring the data packets from the first means of storage to at least the second means of storage when the data packets are intended for at least one second network,
According to the invention, the device comprises:
- means for writing and for reading the data packets to and from the at least two means of storage by slaving the writing of a data packet intended for at least one second network into the second means of storage to the reading of the said data packet from the first means of storage so that the transfer time inside the device is constant for all the data packets.

In this way, the device may possibly operate without the intervention of an outside facility to provide for the transferring of the packets and can, when so required, provide for a constant transfer time for the data packets in the gateway.

This device may possibly enable an outside device such as a processor to be unburdened of the real-time tasks which are highly constraining on account of the high stream throughput required, for example in the case of an audio video type stream, and of the amount of data to be processed.

The data packets arriving in the device are filtered in such a way as to ascertain whether they are intended for another network, or for several networks, when dealing with a broadcast, connected to the device. The filtered packets are then transmitted to the second means of storage.

The slaving of the clocks for reading from the first means of storage and for writing to the second means of storage guarantees synchronization inside the device and can thus make it possible to comply with a constant transfer time for the packets intended for the second network.

According to a preferred embodiment, the device comprises means for replacing the data packets originating from the first network which are not intended for at least one second network by data packets, so-called signalling packets, so as to transmit them to a second network by inserting them in a synchronous manner between the packets received from the first network and transmitted to the second network.

When certain data packets coming from the first network are not intended for a second network, the data stream to be transmitted to the second network then comprises holes into which it may be advantageous to insert other data packets and in particular signalling packets whose time constraints are weak and which can therefore be inserted at undetermined instants.

According to a preferred embodiment, with each data and signalling packet there being associated at least one identifier, the filtering means comprise:
- a table containing the identifiers of the data packets to be transmitted on at least one second network,
- a table containing the identifiers of the data packets to be transmitted to an outside device,
- means for extracting the identifiers of the data packets received from the first network,
- means for comparing the identifiers of the data packets originating from the first network with the identifiers present in the tables.

The device thus comprises additional means allowing it to possibly perform a filtering without the intervention of an external device during the transferring of the data from the first network to a second network.

According to a preferred embodiment, the signalling packets are packets received from the first network and modified by the outside device.

In this way, signalling packets may possibly be modified and reinserted into the stream when these packets are to be transmitted to another network. The intervention by the outside device intervenes during the updating of the tables containing the identifiers and is therefore not related to the transferring of the data packets in the device, thereby making it possible to control the transfer time for the packets in the device.

According to a preferred embodiment, the device comprises:
- means for storing the signalling packets received from the first network and intended for the outside device and
- means for storing the signalling packets received from the outside device and intended to be inserted in a synchronous manner between the packets received from the first network and transmitted to the second network.

According to a preferred embodiment, the device comprises means designed for inserting stream access control packets so as to transmit them to a second network by inserting them in a synchronous manner between the packets received from the first network and transmitted to the second network.

Access control packets allowing the descrambling of the stream whose use is related to the protection of the content of the data may thus possibly be inserted; this is particularly suitable during the transferring of data whose content may not be used and manipulated unrestrictedly.

According to a preferred embodiment, the means for transferring the data packets from the first network to at least one second network are designed to transfer each data packet in a constant time corresponding to the time to process a data packet by the filtering means.

This can ensure the preservation of the integrity of the stream.

The invention also relates to a method for transferring data packets between at least two data networks comprising the steps of:

storing the data packets originating from a first network in a first means of storage, storing the data packets intended for at least one second network in second means of storage, filtering the data packets originating from the first network so as to filter the said packets so as to determine whether the said packets are intended for at least one second network, transferring the data packets from the first means of storage to at least the second means of storage when the data packets are intended for at least one second network, characterized in that it furthermore comprises a step of:

reading and writing the data from and to the at least two means of storage by slaving the writing of a data packet intended for at least one second network in the second means of storage to the reading of the said data packet from the first means of storage, the said method preferably being implemented in a device according to the invention.

The invention also relates to a computer program product comprising program code instructions for executing the step of the process for transferring data packets according to the invention, when the said program is executed on a computer.

BRIEF DESCRIPTION OF THE DRAWINGS

The invention will be better understood and illustrated by means of wholly nonlimiting, advantageous exemplary embodiments and modes of implementation, with reference to the single 1 FIGURE appended which represents an exemplary implementation of a device 1 according to an embodiment of the invention.

DETAILED DESCRIPTION OF THE INVENTION

Figure 1:
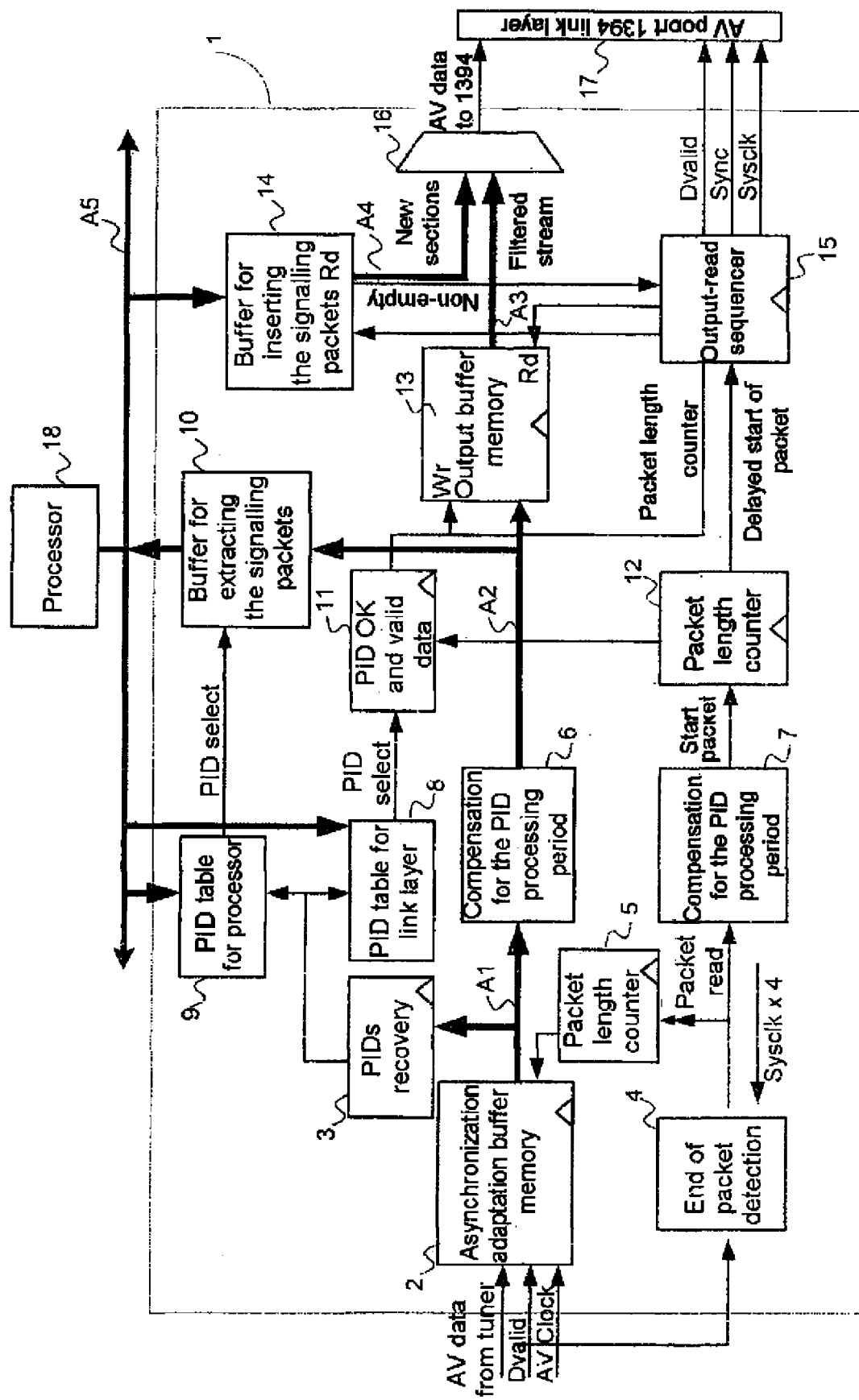

FIG. 1 represents an embodiment in which only two ports are represented, a port on which the data are received and a destination port. The invention applies also to a device having several input ports and several destination ports.

The module 2 consists of a buffer memory of FIFO type for example (the acronym standing for "First in-First out") whose capacity is at least the size of an audio video data packet.

The module 2 receives at input the signal "Avdata from tuner" which represents the audio video data received for example from a device of tuner type, this in the case for example where the incident network is an audio visual network and the gateway lies within a device of satellite or cable decoder type. This bus is an 8-bit bus.

It also receives at input the signal "Dvalid" which indicates whether the data present on the bus "Avdata from tuner" are valid at a given instant. This signal takes the form of a pulse active at the high level throughout the duration of a packet.

It also receives a clock signal "Avclock" which samples the data at the input of the module 2. The frequency of this clock is variable according to the throughput of the incident stream on the bus "Avdata from tuner" and lies between 0 and around 10 MHz. This clock is very unsteady, its duty ratio being able to vary between 40% and 60% of the nominal value and it can be present only when there is valid data on the bus "Avdata from tuner".

The module 2 also receives at input a read signal "Rd" originating from a module 5 responsible for counting the length of the data packets received in the memory module 2.

The integrity of the data and size of the data packets received is therefore guaranteed between the incident clock originating from a cable or satellite tuner which is the clock for writing the audio video packets into the buffer memory of the module 2 and the clock for reading out from this memory which corresponds to the system clock and this renders the processing of the packets by the system clock possible subsequently.

In the preferred embodiment described here, the data packets conveyed on the bus "Avdata from tuner" comply with the MPEG-2 standard and have a length of 188 bytes.

The reading of the data in the memory module 2 commences when the signal for enabling the data on the bus "Avdata from tuner" is disabled, by performing a sampling with a system clock "sysclk" of 12.5 MHz multiplied by 4, i.e. at a frequency of 50 MHz. The clock "sysclk" is strictly greater than "Avclock". The reading of the data can also be performed only on condition that the data packet has been received in its entirety in the memory module 2.

The module 4 detects the end of packet by detecting the falling edge of the incident signal "Dvalid" and when it detects an end of packet, it sends the module 5 a "packet read" signal authorizing it as regards reading in the memory module 2.

The "packet read" signal is also transmitted to a module 7 which delays this signal by a period allowing modules 3, 8 and 11 to process the packet identifier. The module 7 generates a "start of packet" signal intended for a module 12. This signal indicates the start of the writing of the data packets into a memory module 13, it is a pulse whose width is once the period of the system clock, it is also a "packet clock" which indicates each start of a new audio video packet to be processed.

The memory module 13 is advantageously embodied as a memory of FIFO type.

Such a sequencing of the data makes it possible to guarantee the integrity of the data as well as the size of the packets received upon a change of clock tempo and it renders the processing of these packets by the system clock possible subsequently.

The data packets read from the memory module 2 are transferred over the bus A1 to a module 6 and to a module 3.

The module 3 makes it possible to recover the packet identifiers called PIDs.

The PIDs are subsequently transferred to a module 9 which represents a table of the identifiers of the packets which will be intended not for another network but for a processor 18. These may, for example, be signalling packets. The table 9 is linked to the processor 18 by way of the bus A5 which is a bus of memory access type comprising signals such as write, read, package select (also known as chip select), addresses and data.

The module 9 consists of a dual port RAM type memory of capacity 8 K bits (8192 addresses * 1 bit), all the addresses making it possible to scan the complete table of all the possible PIDs. The processor writes a "1" bit to the address corresponding to the value of the PID that it wishes to receive, by way of the module 10. Subsequently, when a new packet turns up, the memory 9 is addressed via the value of its PID. The output of the memory which indicates whether the packet in progress is a packet that the processor wishes to receive is analysed; if it is, the content of the latter is written to the module 10 and made available to the processor by a mechanism operating with interrupt.

This mechanism makes it possible to invoke the processor only when the latter requests it. Specifically, the throughput of the signalling tables being very low (one data packet every 100 ms for certain types of packets such as EMMs (the acronym standing for "Entitlement Management Message") and ECMs (the acronym standing for "Entitlement control message"), the processor 18 will interrogate the device 1 when its 100 ms software clock (also known as timer) expires, an interrupt is returned by the device 1 if at least one packet is waiting.

The module 8 constitutes a table of the identifiers of packets which are intended for another network or for several other networks in the case of broadcast packets. The module 8 has the same structure, dual port memory, and the same functionality as the module 9 but identifies the PIDs to be transmitted to the other networks and not to the processor 18.

This table 8 is also linked to the processor bus A5 and is updated by the processor by way of the bus A5.

The module 11 analyses whether the current packet contained in the memory module 2 is or is not to be transmitted to the network, from the "PID select" signal transmitted by the module 8. When the "PID select" signal is in the high state, the current packet is to be transmitted to the network.

The module 6 makes it possible to delay the data coming from the memory module 2 while the modules 8 and 11 compare the packet identifiers so as to ascertain whether the packets are or are not intended for the module 10 or for the output port 17.

In a variant, the packets may be intended both for the module 10 and for the output port 17, when the processor wants to read packets intended for the network. In this case, in the two identifier tables 8 and 9, the bits corresponding to the identifiers of the packets to be transmitted to the processor 18 and to the output port 17 are set to "1". The "PID select" signals generated by the tables 8 and 9 will both be activated for these packets to be transmitted to the processor 18 and to the output port 17.

The data are transmitted on the bus A2 at the output of the module 6 to the memory module 13 and to the module 10.

The module 10 is activated when the data are to be transmitted to the processor 18 only. The data packets for signalling the incoming stream, hence the old tables, are transmitted to the processor by the module 10. The processor can thus modify these packets and subsequently by way of the table 14, described later, reinject them to the output port 17.

When the packet is intended for the output port 17, it turns up within a set period, set by the module 6, at the input of the memory module 13 so as to be written thereto. This period is the time required to process the packet identifier and which makes it possible to define whether the packet is or is not intended for the output port.

The writing into the memory module 13 is triggered by the packet clock, also delayed by the same period as the data packet to be written.

The "packet being written" signal is the write signal for the data to be transmitted to the output port 17. This signal enables the data of the packet in progress and depends on the delayed input signal "Dvalid" and also on the fact that the PID is identified and hence to be transmitted or otherwise to the output port 17.

When the writing of the data packet into the memory module 13 has commenced, the module 12 counts the number of data written to the memory module 13. This module 12 generates at output a "delayed start of packet" signal intended for a module 15 which sequences the data at the output of the memory module 13. The "delayed start of packet" signal is generated when the counter has reached a predetermined value. This predetermined value is calculated in such a way that it is possible to ascertain whether an incident packet is or is not being written. In the case of an audio video stream in accordance with the MPEG-2 standard, this value lies between 1 and 188.

The module 15 then generates a read signal to the memory module 13 and the data are extracted from the memory module 13 and sent over the bus A3 towards a multiplexer 16.

The stream at the output of the multiplexer 16 is transmitted to the output port 17.

In the exemplary embodiment given, the output bus is a bus complying with the IEEE-1394 standard.

The data are written on the output port and sequenced by the signals emanating from the module 15, namely
"Dvalid"
"Sync"
"Sysclk"
The signal "Dvalid" indicates that the data are valid at the output of the multiplexer 16,
the signal "Sync" indicates the first byte of the data packet,
the signal "Sysclk" samples the data at the output of the multiplexer.

When the data packet at the output of the memory module 2 is not intended for the output port, this being after analysis of the packet identifier by the modules 3 and 8, the packet must nevertheless be read from the memory module 2 so as to free up the memory module 2 in order to write thereto the next packet originating from the incoming network. On the other hand, this packet must not be written to the memory module 13. The "packet being written" signal generated by the module 11 is therefore not activated.

It is thereby advantageous, since the packet is not transmitted to the memory module 13 to transmit a signalling or other-data packet instead of this packet if such a signalling or other-data packet is available and ready to be sent, that is to say if a memory module 14 contains such a signalling or data packet. There is however a constraint as regards the mechanism for reinserting the packets, namely, the sum of the throughputs of the various types of data (signalling or other) to be reinserted must remain around 1 Mbit/s.

The memory module 14 is also linked to the processor 18 by the bus A5.

The processor writes to the memory module 14 the packets of the modified signalling tables and that it wishes to reinject onto the output port 17.

When the processor wishes to send a signalling packet, it writes it to the memory module 14. A "non-empty" signal intended for the module 15 tells it that the memory module 14 comprises a certain number of data packets, lying between 1 and 21, and that it can read data from the memory module 14. The module 15 then generates a read signal "Rd" to the memory module 14 when the "packet being written" signal is not active, thereby affording priority to the packets originating from the incoming network and not to the signalling packets.

As soon as the memory module 14 is empty, an interrupt is sent to the processor 18 so as to signal same thereto.

In the case of an MPEG-2 stream, the signalling packets also known as section packets, have no time relation with the audio video stream. Only the complete transmission of the tables is recurrent.

For the MPEG-2 tables, i.e. the CAT table (the acronym standing for "Conditional access table"), PAT table (the acronym standing for "Program Association Table"), the PMT table (acronym standing for "Program Map Table") or for the access control tables comprising the EMMs and the ECMs, the frequency of transmission of the tables is 100 ms.

The role of the EMM or ECM packets is to unscramble the stream.

These packets have a greater time constraint than the packets of CAT, PAT or PMT type. They must be transmitted every 100 ms for 10 s and are then activated by an order received in an audio video packet and valid for the following 10 s, during which the tables currently being used will continue to be transmitted but also new tables will be transmitted, still with a recurrence of 100 ms, doing so for the next spell of 10 s and so on and so forth. Thus, the current and future tables are transmitted several times, this therefore making it possible to limit the constraints.

In the case of the tables required by the DVB standard (the acronym standing for "Digital Video Broadcast"), this frequency is 500 ms. The DVB standard imposes a regular resending of the content of the section packets, which is carried out by a clock of the processor, and associated with each table which indicates the frequency at which the packets of the section have to be sent.

The operation of extracting the so-called signalling packets and of reinserting these packets into the stream does not therefore impose the use of an automator guaranteeing that this packet is in the stream instead of that which it replaces. An automator of this type would be very resource-expensive, this being incompatible in equipment intended for the public at large.

The read-out sequencer provides for the synchronization necessary for reinserting the packet of the new section into the stream transmitted on the IEEE-1394 network.

The data emanating from the memory module 14 are then sent to the multiplexer 16 and thereafter to the output port 17 and sequenced by the signals previously described emanating from the sequencer 15, namely "Dvalid", "Sync" and "Sysclk".

What is claimed is:

1. Device for transferring data packets between at least two data networks comprising:
    a first buffer for temporarily buffering all data packets originating from a first network,
    a filter filtering said buffered data packets originating from said first network to determine data packets intended for at least one second network,
    a second buffer temporarily buffering filtered data packets intended for said at least one second network,
    means for transferring said filtered data packets from said first buffer to said second buffer when said filtered data packets are intended for said at least one second network,
    means for writing said filtered data packets to said second buffer by slaving writing to the reading of said filtered data packets from said first buffer so that transfer time inside said device is constant for all data packets,
    means for replacing said filtered data packets originating from the first network, not intended for said at least one second network, with signalling packets, for transmission by said second network by insertion in a synchronous manner between said filtered packets received from said first network and transmitted to said second network, and
    means for reading said filtered data packets from said second buffer intended for said second network when said second buffer contains a pre-determined amount of data.

2. Device according to claim 1, wherein each data and signalling packet has at least one identifier, said filter comprises:
    a first table containing identifiers of data packets to be transmitted on said at least one second network,
    a second table containing identifiers of data packets to be transmitted to an outside device,
    means for extracting said identifiers of said data packets received from said first network,
    means for comparing said data packet identifiers with identifiers present in said tables.

3. Device according to claim 2, wherein said signalling packets received from said first network are modified by said outside device.

4. Device according to claim 3, further comprises:
    a first store storing said signalling packets from said first network and intended for said outside device, and
    a second store storing said signalling packets from said outside device for insertion in a synchronous manner between said filtered packets received from said first network and transmitted to said second network.

5. Device according to claim 1, further comprises means for inserting stream access control packets for transmission to a said second network by synchronous insertion between said packets from said first network and transmitted to said second network.

6. Device according to claim 1, wherein said means for transferring said filtered data packets from said first network to at said least one second network transfers each filtered data packet in a constant time corresponding to the time to process a data packet by said filter.

7. Process for transferring data packets between at least two data networks comprising the steps of:
    storing data packets from a first network,
    filtering said stored data packets to determine packets intended for at least one second network,
    storing said filtered data packets,
    writing said filtered data packets to said storage by slaving said writing to the reading of said stored data packets from said first network so that transfer time is constant for all data packets,
    replacing said data packets not intended for said at least one second network by signalling packets for transmission to said second network by synchronous insertion between said filtered data packets, and
    reading the said stored filtered data packets when said stored filtered data packets represent a pre-determined amount of data.

* * * * *